United States Patent
Lin et al.

(10) Patent No.: US 7,069,399 B2
(45) Date of Patent: Jun. 27, 2006

(54) METHOD AND RELATED APPARATUS FOR REORDERING ACCESS REQUESTS USED TO ACCESS MAIN MEMORY OF A DATA PROCESSING SYSTEM

(75) Inventors: Frank Lin, Taipei Hsien (TW); Victor Wu, Taipei Hsien (TW); Jacky Tsai, Taipei Hsien (TW); Hsiang-Yi Huang, Taipei Hsien (TW); Vincent Chang, Taipei Hsien (TW); Michael Liu, Taipei Hsien (TW); Heng-Chen Ho, Taipei Hsien (TW)

(73) Assignee: VIA Technologies Inc., Hsin-Tien (TW)

( * ) Notice: Subject to any disclaimer, the term of this patent is extended or adjusted under 35 U.S.C. 154(b) by 355 days.

(21) Appl. No.: 10/609,386

(22) Filed: Jul. 1, 2003

(65) Prior Publication Data

US 2004/0139286 A1 Jul. 15, 2004

Related U.S. Application Data

(60) Provisional application No. 60/440,046, filed on Jan. 15, 2003.

(51) Int. Cl.
*G06F 13/00* (2006.01)

(52) U.S. Cl. .................................................... 711/158
(58) Field of Classification Search ................... None
See application file for complete search history.

(56) References Cited

U.S. PATENT DOCUMENTS 6,564,304 B1 * 5/2003 Van Hook et al. .......... 711/154

OTHER PUBLICATIONS

Whatis.com, Northbridge, http://whatis.techtarget.com/definition/0,,sid9_gci750600,00.html, p. 1.*

* cited by examiner

*Primary Examiner*—Donald Sparks
*Assistant Examiner*—Jared Rutz
(74) *Attorney, Agent, or Firm*—Winston Hsu (57) ABSTRACT

A method and related apparatus for reordering access requests used to access main memory of a data processing system. The method includes receiving one or more access requests for accessing the memory device in a first predetermined order, and reordering the access requests in a second predetermined order to be processed in a request queue by relocating a first access request to follow a second access request accessing a same memory page to increase processing efficiency. In addition, the relocating is prohibited if it increases a processing latency for a third access request to exceed a predetermined limit.

34 Claims, 6 Drawing Sheets

METHOD AND RELATED APPARATUS FOR REORDERING ACCESS REQUESTS USED TO ACCESS MAIN MEMORY OF A DATA PROCESSING SYSTEM

CROSS REFERENCE TO RELATED APPLICATIONS

The application claims the benefit of U.S. Provisional Application No. 60/440,046, which was filed on Jan. 15, 2003 and entitled "A New Latency-Controlled Reorder Method for High-Performance Data Computing System".

BACKGROUND OF INVENTION

1. Field of the Invention

The present invention relates to a method and related apparatus for accessing a memory device of a computer system. In particular, the present invention discloses a method and related apparatus for reordering access requests used to access the memory device of a computer system.

2. Description of the Prior Art

Figure 1:
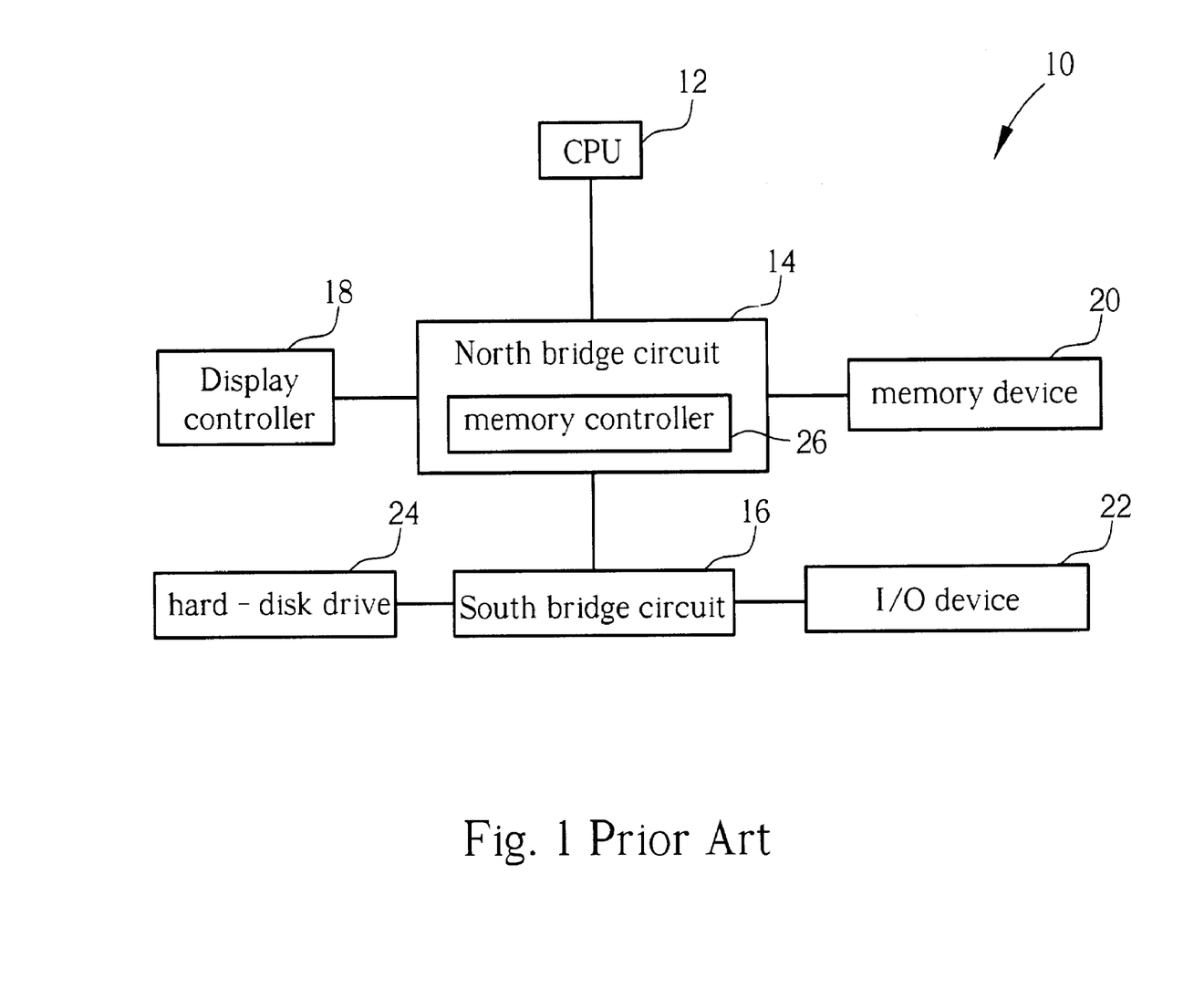
FIG. 1 is a diagram of a prior art computer system.

Data processing systems are systems that manipulate, process, and store data, and are well known in the art. Personal computer systems and their associated circuitry are such data processing systems. FIG. 1 is a diagram of a prior art computer system 10. The computer system 10 comprises a central processing unit (CPU) 12, a north bridge circuit 14, a south bridge circuit 16, a display controller 18, a memory device 20, an I/O device 22, and a hard-disk drive 24. The CPU 12 is used to control the operation of the computer system 10. The north bridge circuit 14 is used to arbitrate signals transmitted between the CPU 12 and high-speed peripheral devices such as the display controller 18 and the memory device 20. The display controller 18 is used to handle display data, and the memory device 20 is used to process and store data. The south bridge circuit 16 is used to arbitrate signals transmitted between the north bridge circuit 14 and low-speed peripheral devices such as the I/O device 22 and the hard-disk drive 24. The I/O device 22 (a keyboard for example) is used to receive control signals inputted by an end-user. The hard-disk drive 24 usually is a non-volatile memory device, while the memory device 20 usually is a volatile memory device. The memory device 20 may include a dynamic random access memory (DRAM) to store processing programs and data. For example, the programs and data stored on the hard-disk drive 24 are loaded into the memory device 20 so that the CPU 12 is capable of executing the programs more quickly. Then, the data processed by the CPU 12 are stored back to the memory device 20. It is noted that the north bridge circuit 14 has a memory controller 26 for controlling the access of the memory device 20. When a master device such as the CPU 12 or the display controller 18 issues access requests to the memory controller 26, the memory controller 26 accesses the memory device 20 according to the received access requests. With an in-order access scheme, the memory controller 26 responds to the master device according to the order of the received access requests. For example, the display controller 18 outputs read requests RA1, RA2, RA3, RA4, and RA5 in an order to acquire data D1, D2, D3, D4, and D5 stored in the memory device 20 respectively. Even the memory controller 26 executes the read requests RA1, RA2, RA3, RA4, and RA5 out of its original order, the memory controller 26 will still orderly transmit the retrieved data D1, D2, D3, D4, and D5 to the display controller 18.

Figure 2:
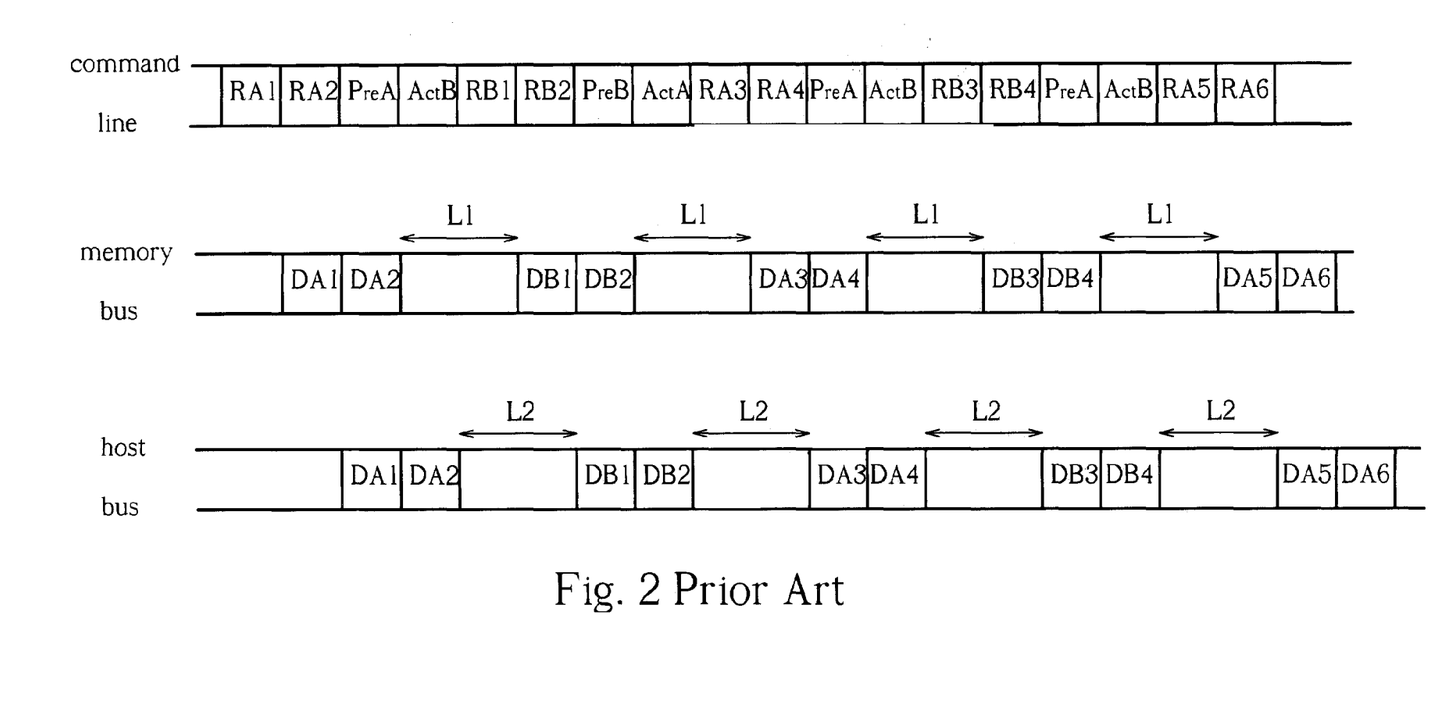
FIG. 2 is a diagram showing a first data access operation of a memory device shown in FIG. 1.

FIG. 2 is a diagram showing a first prior art data access operation of the memory device 20. For example, the CPU 12 sequentially produces read requests RA1, RA2, RB1, RB2, RA3, RA4, RB3, RB4, RA5, RA6 for acquiring data DA1, DA2, DB1, DB2, DA3, DA4, DB3, DB4, DA5, DA6, which are stored in the memory device 20. It is assumed that data DA1, DA2, DA3, DA4, DA5, DA6 are all stored on page A of the memory, and data DB1, DB2, DB3, DB4 are all stored on page B. As shown in FIG. 2, the memory controller 26 executes the read requests RA1, RA2, RB1, RB2, RA3, RA4, RB3, RB4, RA5, RA6 in its original order. The memory controller 26 executes the read request RA1 to retrieve data DA1. The memory device 20 transmits the acquired data DA1 to the memory controller 26 via a memory bus. The memory controller 26 then transfers the data DA1 to the CPU 12, thereby completing the data retrieval for the read request RA1. Since data DA2 called by the next read request RA2 is also located on the same page A, the memory device 20 adopts a burst mode to access the data DA2. The data DA2 is quickly retrieved, and is transmitted to the memory controller 26 via the memory bus. The memory controller 26 then transfers the data DA2 to the CPU 12 to finish the data delivery for the read request RA2. However, the read request RB1 is expected to retrieve data DB1 that is located on page B which is different from page A. In order to access the desired page B, the memory device 20 needs to precharge the opened page A first before activating the wanted page B. Therefore, the memory controller 26 successively issues a command PreA for precharging the opened page A, and issues a command ActB for activating the wanted page B. After page B is successfully opened, the memory controller 26 is ready to access data stored on page B. Read requests RB1, RB2 are sequentially executed by the memory controller 26 to retrieve corresponding data DB1, DB2. Then, the memory device 20 provides data DB1, DB2 to the memory controller 26 via the memory bus. The memory controller 26 transfers the acquired data DB1, DB2 to the CPU 12, thereby completing the data retrieval for the read requests RB1, RB2. As the next command calls for data retrieval from page A, commands PreB, ActA are successively issued to precharge the opened page B and activate the wanted page A because data DA3 is located on page A. The above-mentioned process is performed for accessing following data DA3, DA4, DB3, DB4, DA5, DA6 by switching back and forth between page A and B. As it is shown, when two adjacent read requests retrieve data located on different pages, the memory device 20 has to spend extra time to switch between pages. Consequently, the precharging operation and the activation operation deteriorate the overall performance of the memory device 20. As shown in FIG. 2, latency L1 of the memory bus is introduced owing to the precharging operation and the activation operation. Similarly, latency L2 of the host bus is also introduced accordingly due to the imposition of L1.

Figure 3:
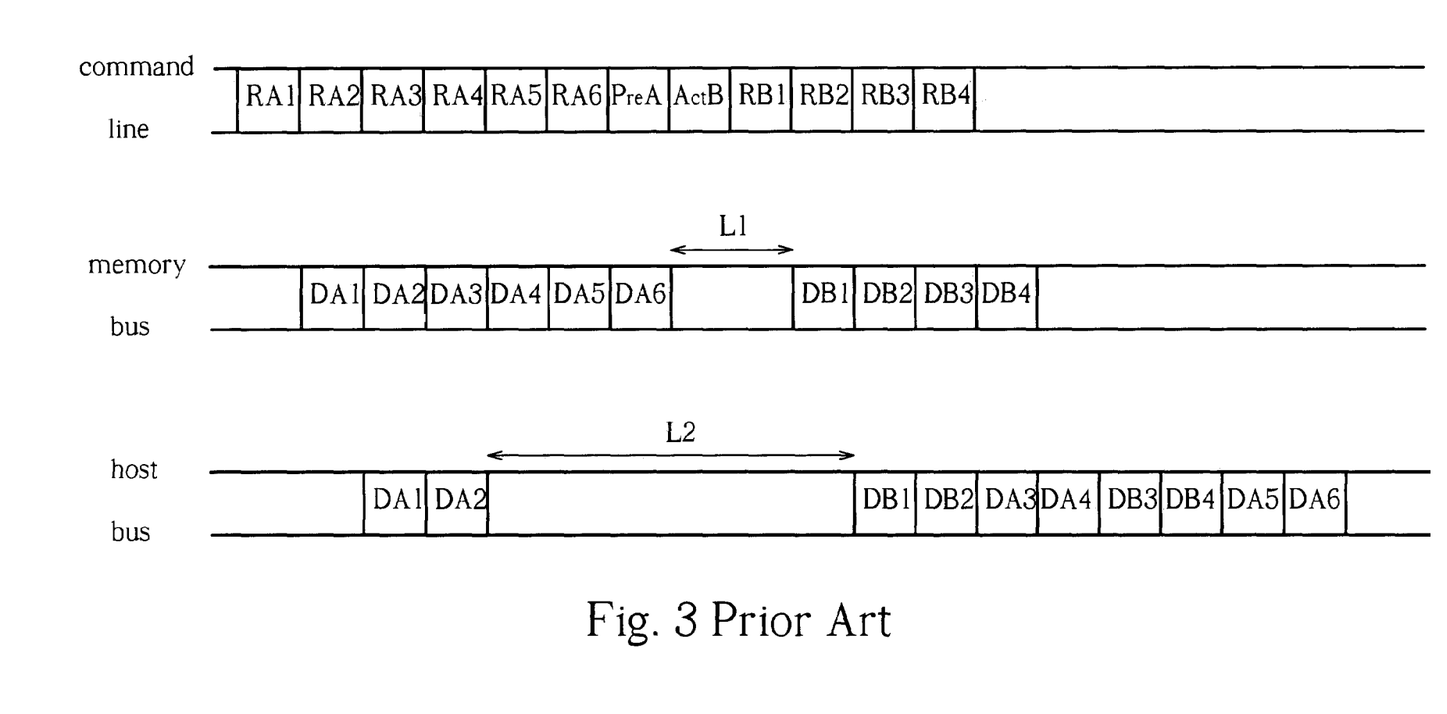
FIG. 3 is a diagram showing a second data access operation of the memory device shown in FIG. 1.

Generally speaking, when a master device such as the CPU 12 accesses the memory device 20, the precharging operation and the activation operation worsens the performance of the overall data access operation. Therefore, a prior art reordering scheme is used to diminish the effect caused by the precharging operation and the activation operation. FIG. 3 is a diagram showing an improved data access operation of the memory device 20. The CPU 12 sequentially generates read requests RA1, RA2, RB1, RB2, RA3, RA4, RB3, RB4, RA5, RA6 for acquiring data DA1, DA2, DB1, DB2, DA3, DA4, DB3, DB4, DA5, DA6 stored in the memory device 20. The memory controller 26 reorders the received read requests RA1, RA2, RB1, RB2, RA3, RA4, RB3, RB4, RA5, RA6 so that the memory controller 26 executes the read requests RA1, RA2, RA3, RA4, RA5, RA6 before it executes RB1, RB2, RB3, RB4, thereby reducing the time spent on switching between two different pages. As shown in FIG. 3, after the read request RA6 is successfully executed, commands, PreA, ActB are issued by the memory controller 26 for precharging page A and activating page B. Only one page switch operation is performed, and only one latency L1 is introduced for the memory bus. However, the memory controller 26 has to transfer the retrieved data to the CPU 12 according to the original order defined by the sequence in which requests are issued. In other words, the memory controller 26 needs to deliver data DA1, DA2, DB1, DB2, DA3, DA4, DB3, DB4, DA5, DA6 to the CPU 12 sequentially. Even if the memory device 20 retrieves data DA1, DA2, DA3, DA4, DA5, DA6 quickly in a burst mode, after delivering DA1 and DA2, the host bus has to wait until the data DB1 has been retrieved by the read request RB1. It is noted that since DA3, DA4, DA5, DA6 have been successfully retrieved and transferred to the memory controller 26, data DA3, DA4 are immediately transmitted to the CPU 12 after data DB2 has been transmitted to CPU 12. As such, only one latency L2 is introduced for the host bus. Comparing with the first data access operation illustrated in FIG. 2, the data access operation illustrated in FIG. 3 needs fewer page switch operations, but with a much greater latency L2 for the host bus. The performance of the memory bus is improved at the cost of the performance of the host bus. If the read request RB1 is delayed significantly due to the reordering of the requests, the latency L2 can seriously deteriorate the overall data access operation. It is thus also hard to benefit from the reordering of the read requests as illustrated in FIG. 3.

SUMMARY OF INVENTION

It is therefore an objective of this invention to provide a method and related apparatus capable of reordering access requests used to access a memory device.

Briefly summarized, the preferred embodiment of the claimed invention discloses a method for accessing a memory device of a computer system, the method comprising receiving one or more access requests for accessing the memory device in a first predetermined order, and reordering the access requests in a second predetermined order to be processed in a request queue by relocating a first access request to follow a second access request accessing a same memory page to increase processing efficiency. In addition, the relocating is prohibited if it increases a processing latency for a third access request to exceed a predetermined limit.

The claimed invention is capable of appropriately balancing performance of the memory bus and performance of the host bus to optimize overall performance of the data access operation.

These and other objectives of the present invention will no doubt become obvious to those of ordinary skilled in the art after reading the following detailed description of the preferred embodiments, which are illustrated in the various figures and drawings.

DETAILED DESCRIPTION

Figure 4:
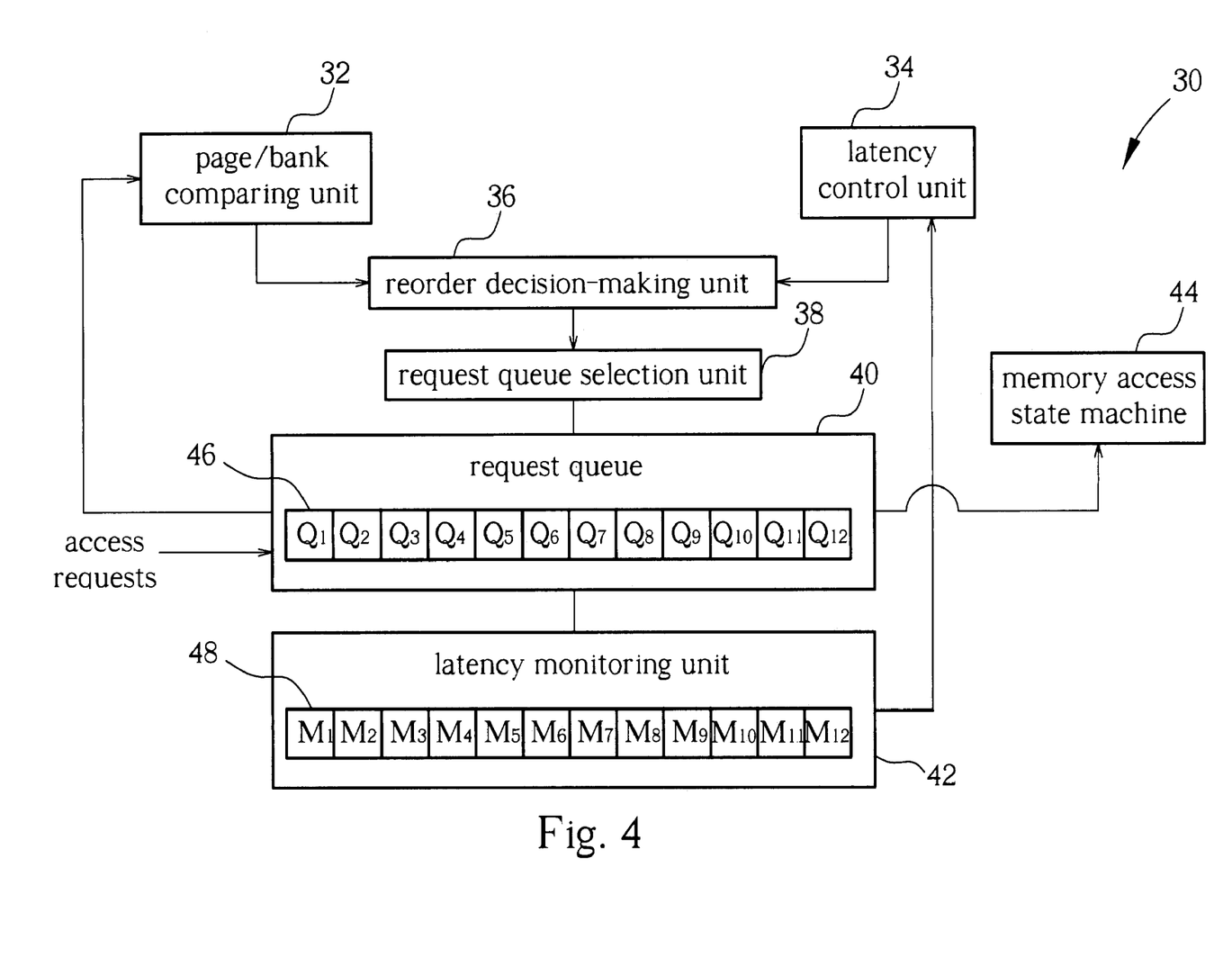
FIG. 4 is a block diagram of a memory controller according to the present invention.

FIG. 4 is a sample block diagram of a memory controller 30 according to one example of the present invention. The memory controller 30 comprises a page/bank comparing unit 32, a latency control unit 34, a reorder decision-making unit 36, a request queue selection unit 38, a request queue 40, a latency monitoring unit 42, and a memory access state machine 44. In addition, the request queue 40 includes a plurality of queue entries 46, that is, Q1, Q2, Q3, Q4, Q5, Q6, Q7, Q8, Q9, Q10, Q11, Q12, and the latency monitoring unit 42 includes a plurality of monitoring registers 48, that is, M1, M2, M3, M4, M5, M6, M7, M8, M9, M10, M11, M12 corresponding to the queue entries Q1, Q2, Q3, Q4, Q5, Q6, Q7, Q8, Q9, Q10, Q11, Q12 respectively. Each of the monitoring registers M1, M2, M3, M4, M5, M6, M7, M8, M9, M10, M11, M12 is used to record a latency value of the corresponding queue entry. The queue entry Q1 is a leading entry with a highest priority, while the queue entry Q12 is a tail entry corresponding to a lowest priority. In other words, the request stored in the queue entry Q1 will be executed first.

When access requests issued by a master device are received by the memory controller 30, the access requests are inputted into the request queue 40. Each of the access requests includes address information, read/write information, length information, and some necessary flags (request priority values and write-back indicators for example). It is noted that the master device mentioned above can be the CPU 12, the display controller 18, the hard-disk drive 24, or the I/O device 22 shown in FIG. 1. The page/bank comparing unit 32 identifies pages expected to be accessed by the received access requests, and informs the reorder decision-making unit 36 of the page information. The latency control unit 34 detects a signal from the latency monitoring unit 42 to determine whether latency values stored in the monitoring registers 48 has reached a predetermined-limit such as a maximum allowance value. In addition, if the monitoring register 48 stores the maximum allowance value, the latency control unit 34 will block the reorder decision-making unit 36 from delaying an access request kept in a queue entry corresponding to the monitoring register 48. The reorder decision-making unit 36 receives information outputted from the page/bank comparing unit 32 and the latency control unit 34 to determine positions of the access requests in the request queue 40. That is, the page/bank comparing unit 32 is capable of identifying currently opened pages, and gives information about recommendatory positions of the received access requests in the request queue 40 to the reorder decision-making unit 36. Then, the reorder decision-making unit 36 sends a command to the request queue selection unit 38 for adjusting positions of access requests in the request queue 40. As such, the access requests are reordered to be stored in different queue entries 46 so that the access requests have new positions in the request queue 40. The priorities of the access requests are then adjusted. The memory access state machine 44 then sequentially accesses the memory device 20 according to the access requests stored in the queue entries 46.

Figure 5:
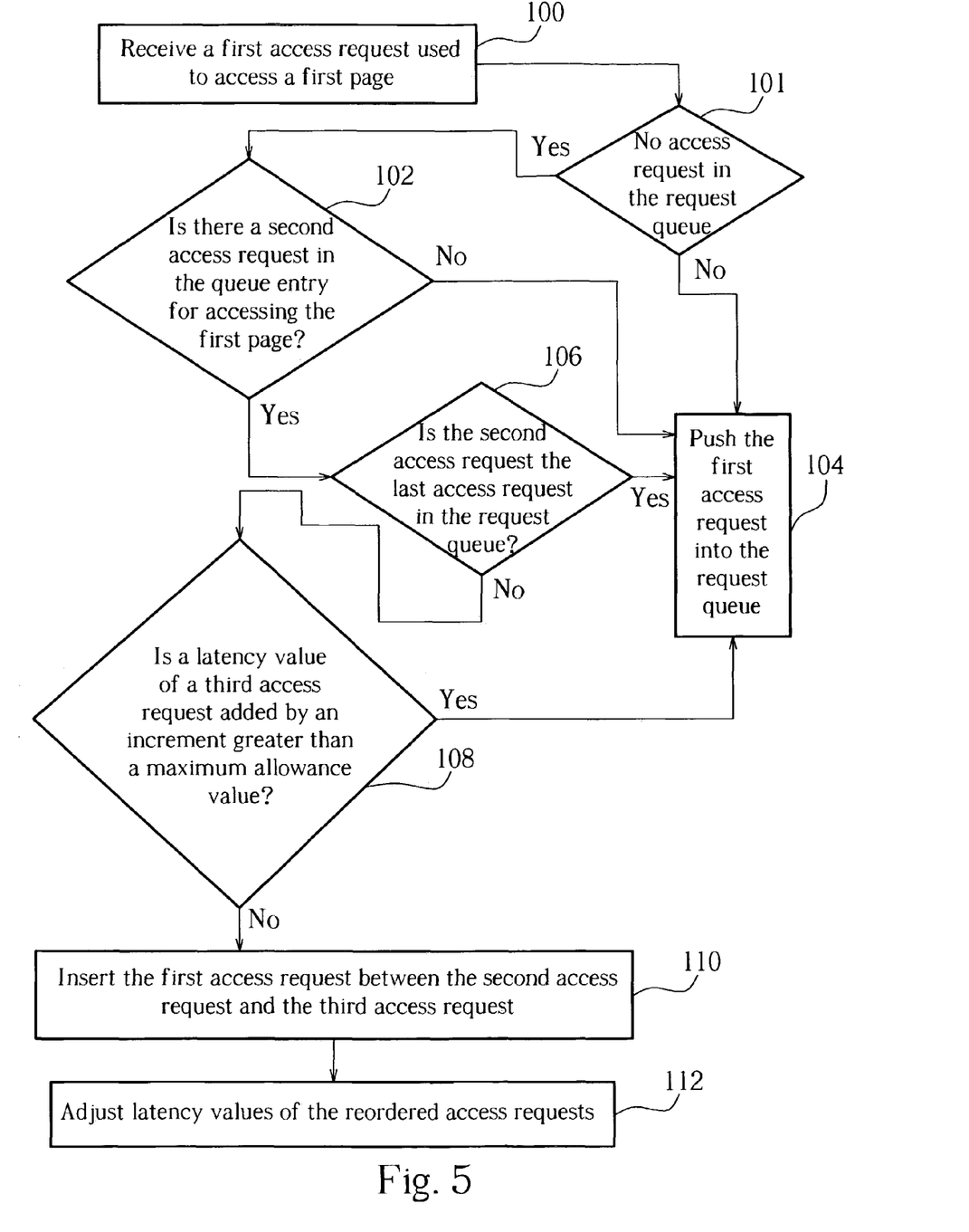
FIG. 5 is a flow chart showing a reordering process according to one example of the present invention.

FIG. 5 is a flow chart showing the operation of an access request reordering process according to the present invention. Detailed operation of the reorder process is described as follows. The memory controller 30 receives a first access request. The page/bank comparing unit 32 identifies that the first access request is to access a first page within the memory device 40 (step 100). The memory controller 26 then checks whether the request queue 40 is empty. If there is currently no access request in the request queue 40, the reorder decision-making unit 36 does not need to perform the reordering process, and the received first access request is just pushed into the request queue 40. In addition, the first access request is kept in the queue entry Q1 with the highest priority, and an initial value (0 for example) is assigned to the corresponding latency value stored in the monitoring register M1. On the other hand, if the request queue 40 contains an access request, in step 102, it is determined whether there is any access request in the request queue 40 for accessing the first page. If no access request in the request queue is to access the first page, the reorder decision-making unit 36 does not need to perform the reordering process, and the received first access request is just pushed into the request queue 40 to have a lowest priority within the access requests in the request queue 40. If, in step 102, the page/bank comparing unit 32 finds out that there is a second access request in the request queue 40 used to access the first page the reorder decision-making unit 36 determines whether the second access request is the last one or has the lowest priority (step 106). If the second access request has the lowest priority, the reorder decision-making unit 36 does not need to perform the reordering process, and the received first access request is just pushed into the request queue 40 (step 104). In other words, the stored first access request then has the lowest priority. If the second access request does not have the lowest priority in the queue, the step 108 is performed to check whether the reorder decision-making unit 36 should begin reordering the access requests. That is, if a latency value of a third access request following the second access request is going to be increased by an incremental value caused by executing the first access request before the third access request and such increased value is greater than a predetermined maximum allowance value, the reorder decision-making unit 36 can not start the reordering process because too much delay will be introduced before executing the third access request. The first access request is then pushed into the request queue 40 as normal. Back in step 108, if the maximum allowance value is not breached, the reorder decision-making unit 36 instructs the request queue selection unit 38 to insert the first access request between the second access request and the third access request (step 110). In addition, the latency values of the access requests starting from the third access request are increased accordingly due to the insertion of the first access request (step 112). It is noted that the first request and the second request are intended to access the same first page within the memory device 40. It is further noted that the second request and the third request have already been stored in the request queue 40, and the second request has a queue priority greater than that of the third request. The initial value is assigned to the latency value stored in a monitoring unit 48 corresponding to a queue entry 46 associated with the first access request.

The main objective for having the maximum allowance value is to prevent the latency of the host bus from being seriously impacted. Newly received access request accessing a predetermined page is annexed to those access requests accessing the same predetermined page for reducing the time spent on switching between different pages. However, if the insertion of the received access request makes the delayed access requests have latency values greater than the maximum allowance value, the reordering process is skipped. The latency of the host bus is thus not going to be unduly prolonged, and the overall performance of the data access operation is not compromised.

In order to better describe features of the present invention, an example is introduced. Suppose that the maximum allowance value is 2 and the incremental value caused by the inserted access request, for latency value calculation purpose, is 1 for the access request behind the inserted access request. It is noted that values other than 2 and 1 can be assigned to the maximum allowance value and the incremental value respectively depending on the design of the computer system as they are fully programmable. It is assumed that a master device (CPU 12 for example) sequentially produces read requests RA1, RA2, RB1, RB2, RA3, RA4, RB3, RB4, RA5, RA6 for acquiring data DA1, DA2, DB1, DB2, DA3, DA4, DB3, DB4, DA5, DA6 stored in the memory device 20. It is noted that data DA1, DA2, DA3, DA4, DA5, DA6 are all stored on page A of the memory device 20, and data DB1, DB2, DB3, DB4 are all stored on page B of the memory device 20. It is understood for the purpose of this disclosure, reordering operation for a read request is used as an example of the access request, but the same concept can apply to a write request as well. The request queue for the access requests, queue entries, and the monitoring registers (collectively "reordering parameters") are listed as follows:

Read requests: {RA1, RA2, RB1, RB2, RA3, RA4, RB3, RB4, RA5, RA6}
Queue entries: {Q1, Q2, Q3, Q4, Q5, Q6, Q7, Q8, Q9, Q10, Q11, Q12}
Monitoring registers: {M1, M2, M3, M4, M5, M6, M7, M8, M9, M10, M11, M12}

As there is no read request stored in the request queue 46 when RA1 is processed, the read request RA1 is pushed into the request queue 46 (steps 101, 104), and is stored by the queue entry Q1. In addition, an initial value (0 for example) is assigned to the monitoring register M1 corresponding to the queue entry Q1. The reordering parameters have now become:

Read-requests: {RA2, RB1, RB2, RA3, RA4, RB3, RB4, RA5, RA6, RB5, RB6}
Queue entries: {Q1 (RA1), Q2, Q3, Q4, Q5, Q6, Q7, Q8, Q9, Q10, Q11, Q12}
Monitoring registers: {M1 (0), M2, M3, M4, M5, M6, M7, M8, M9, M10, M11, M12}

Although the read requests RA1, RA2 both retrieve data stored on the same page, the read request RA1 in the request queue 40 is the only and last one, the read request RA2, therefore, is also pushed into the request queue 40 (steps 106, 104) and is stored in the queue entry Q2. In addition, the initial value is assigned to the monitoring register M2 corresponding to the queue entry Q2. The reordering parameters now look like:

Read requests: {RB1, RB2, RA3, RA4, RB3, RB4, RA5, RA6, RB5, RB6}
Queue entries: {Q1 (RA1), Q2 (RA2), Q3, Q4, Q5, Q6, Q7, Q8, Q9, Q10, Q11, Q12}
Monitoring registers: {M1 (0), M2 (0), M3, M4, M5, M6, M7, M8, M9, M10, M11, M12}

Now, the read requests RA2, RB1 retrieve data stored on different pages A and B. The read request RB2, therefore, is just pushed into the request queue 40 (steps 102, 104) and is stored in the queue entry Q3. In addition, the initial value is assigned to the monitoring register M3 corresponding to the queue entry Q3. The reordering parameters now look like:

Read requests: {RB2, RA3, RA4, RB3, RB4, RA5, RA6, RB5, RB6}
Queue entries: {Q1 (RA1), Q2 (RA2), Q3 (RB1), Q4, Q5, Q6, Q7, Q8, Q9, Q10, Q11, Q12}
Monitoring registers: {M1 (0), M2 (0), M3 (0), M4, M5, M6, M7, M8, M9, M10, M11, M12}

The read requests RB1, RB2 now both retrieve data stored on the same page B. However, the read request RB1 is the last one in the request queue 40. The read request RB2, therefore, is just pushed into the request queue 40 (steps 106, 104) and is stored in the queue entry Q4. In addition, the initial value is assigned to the monitoring register M4 corresponding to the queue entry Q4. The reordering parameters now have become:

Read requests: {RA3, RA4, RB3, RB4, RA5, RA6, RB5, RB6}
Queue entries: {Q1 (RA1), Q2 (RA2), Q3 (RB1), Q4 (RB2), Q5, Q6, Q7, Q8, Q9, Q10, Q11, Q12}
Monitoring registers: {M1 (0), M2 (0), M3 (0), M4 (0), M5, M6, M7, M8, M9, M10, M11, M12}

The read requests RA2, RA3 demand required data stored on the same page A (step 102). In addition, the read request RA2 is not the last request in the request queue 40 (step 104). It is determined that the latency value of the monitoring register M3 increased by the incremental value is not greater than the maximum allowance value (step 108). Therefore, the read requests RB1, RB2 are rearranged by positioning the read request RA3 after Q2 (step 110). The queue entry Q3 now stores the read request RA3 instead, and the read requests RB1, RB2 are delayed, and stored by queue entries Q4 and Q5 respectively. Because the read requests RB1, RB2 are delayed, the related latency values are incremented accordingly. In addition, the initial value is assigned to the monitoring register M3 corresponding to the queue entry Q3. The resulting parameters are listed as follows.

Read requests: {RA4, RB3, RB4, RA5, RA6, RB5, RB6}
Queue entries: {Q1 (RA1), Q2 (RA2), Q3 (RA3), Q4 (RB1), Q5 (RB2), Q6, Q7, Q8, Q9, Q10, Q11, Q12}
Monitoring registers: {M1(0), M2 (0), M3 (0), M4 (1), M5 (1), M6, M7, M8, M9, M10, M11, M12}

The read request RA4 accesses data stored on the same page A as RA3 (step 102). In addition, the read request RA3 is not the last request in the request queue 40 (step 104). It is also obvious that the latency value of the monitoring register M4 after the adjustment is not greater than the maximum allowance value (step 108). Therefore, the read requests RB1, RB2 are further pushed back due to the insertion of the read request RA4 (step 110). The queue entry Q4 now stores the read request RA4 instead, and the read requests RB1, RB2 are delayed to be stored by queue entries Q5 and Q6 respectively. Because the read requests RB1, RB2 are delayed, the related latency values are adjusted again by the incremental value. In addition, the initial value is assigned to the monitoring register M4 corresponding to the queue entry Q4. The reordering parameters are now listed as follows.

Read requests: {RB3, RB4, RA5, RA6, RB5, RB6}
Queue entries: {Q1 (RA1), Q2 (RA2), Q3 (RA3), Q4 (RA4), Q5 (RB1), Q6 (RB2), Q7, Q8, Q9, Q10, Q11, Q12}
Monitoring registers: {M1(0), M2(0), M3(0), M4(0), M5(2), M6 (2), M7, M8, M9, M10, M11, M12}

Now, the read requests RB2, RB3 both intend to retrieve data stored on the same page B. However, the read request RB2 in the request queue 40 is the last one. The read request RB3, therefore, is pushed into the request queue 40 (steps 106, 104) and is stored in the queue entry Q7. In addition, the initial value is assigned to the monitoring register M7 corresponding to the queue entry Q7. The parameters are as follows:

Read requests: {RB4, RA5, RA6, RB5, RB6}
Queue entries: {Q1 (RA1), Q2 (RA2), Q3 (RA3), Q4 (RA4), Q5 (RB1), Q6 (RB2), Q7 (RB3), Q8, Q9, Q10, Q11, Q12}
Monitoring registers: {M1(0), M2(0), M3(0), M4(0), M5(2), M6 (2), M7(0), M8, M9, M10, M11, M12}

Similarly, the read requests RB3, RB4 both retrieve data stored on the same page B, and the read request RB3 in the request queue 40 is the last one. The read request RB4, therefore, is also pushed into the request queue 40 (steps 106, 104) and is stored in the queue entry Q8. In addition, the initial value is assigned to the monitoring register M8 corresponding to the queue entry Q8. The parameters are shown as follows:

Read requests: {RA5, RA6, RB5, RB6}
Queue entries: {Q1 (RA1), Q2 (RA2), Q3 (RA3), Q4 (RA4), Q5 (RB1), Q6 (RB2), Q7 (RB3), Q8 (RB4), Q9, Q10, Q11, Q12}
Monitoring registers: {M1(0), M2(0), M3(0), M4(0), M5(2), M6 (2), M7(0), M8(0), M9, M10, M11, M12}

The read requests RA4 and RA5 access data stored on the same page A (step 102), and the read request RA4 is not the last request in the request queue 40 (step 106). If the read request RB1 next to the read request RA4 is delayed again, the corresponding latency value increased by the incremental value will become 3, and will exceed the maximum allowance value (step 108). Therefore, the read requests in the request queue 40 are not reordered. The read request RA5, therefore, is pushed into the request queue 40 (step 104) and is stored in the queue entry Q9. In addition, the initial value is assigned to the monitoring register M9 corresponding to the queue entry Q9. The parameters are shown as follows:

Read requests: {RA6, RB5, RB6}
Queue entries: {Q1 (RA1), Q2 (RA2), Q3 (RA3), Q4 (RA4), Q5 (RB1), Q6 (RB2), Q7 (RB3), Q8 (RB4), Q9 (RA5), Q10 Q11, Q12}
Monitoring registers: {M1(0), M2(0), M3(0), M4(0), M5(2), M6 (2), M7(0), M8(0), M9(0), M10, M11, M12}

The read requests RA5, RA6 both retrieve data stored on the same page A. However, the read request RA5 in the request queue 40 is the last one. The read request RA6, therefore, is also pushed into the request queue 40 (steps 106, 104) and is stored in the queue entry Q10. In addition, the initial value is assigned to the monitoring register M10 corresponding to the queue entry Q10. The parameters are shown as follows:

Read requests: {RB5, RB6}
Queue entries: {Q1 (RA1), Q2 (RA2), Q3 (RA3), Q4 (RA4), Q5 (RB1), Q6 (RB2), Q7 (RB3), Q8 (RB4), Q9 (RA5), Q10 (RA6), Q11, Q12}
Monitoring registers: {M1(0), M2(0), M3(0), M4(0), M5(2), M6 (2), M7(0), M8(0), M9(0), M10(0), M11, M12}

The read request RB5, as RB4, now intends to access data stored on the same page B (step 102). In addition, the read request RB4 is not the last request in the request queue 40 (step 104). The latency value of the monitoring register M9 is still 0, and will become 1 after additional delay, and will not be greater than the maximum allowance value (step 108). Therefore, the read requests RA5, RA6 are reordered due to the insertion of the read request RB5 (step 110). The queue entry Q9 stores the read request RB5 instead, and the read requests RA5, RA6 are delayed so that the queue entries Q10, Q11 hold the read requests RA5, RA6 respectively. Because the read requests RA5, RA6 are delayed, the related latency values are adjusted. In addition, the initial value is assigned to the monitoring register M9 corresponding to the queue entry Q9 holding the inserted read request RB5. The resulted reordering parameters are as follows:

Read requests: {RB6}
Queue entries: {Q1 (RA1), Q2 (RA2), Q3 (RA3), Q4 (RA4), Q5 (RB1), Q6 (RB2), Q7 (RB3), Q8 (RB4), Q9 (RB5), Q10 (RA5), Q11 (RA6), Q12}
Monitoring registers: {M1(0), M2(0), M3(0), M4(0), M5(2), M6 (2), M7(0), M8(0), M9(0), M10(1), M11(1), M12}

The read request RB6, as RB5, intends to access data stored on the same page B (step 102). In addition, the read request RB5 is not the last request in the request queue 40 (step 104). It is obvious that the latency value of the monitoring register M10 after adjustment is not greater than the maximum allowance value (step 108). Therefore, the read requests RA5, RA6 are reordered again due to the insertion of the read request RB6 (step 110). The queue entry Q10 stores the read request RB6 instead, and the read requests RA5, RA6 are further delayed so that the queue entries Q11, Q12 hold the read requests RA5, RA6 respectively. Because the read requests RA5, RA6 are delayed, the related latency values are adjusted again. In addition, the initial value is assigned to the monitoring register M10 corresponding to the queue entry Q10 holding the inserted read request RB6. The final reordering parameters are shown as follows:

Read requests: { }
Queue entries: {Q1 (RA1), Q2 (RA2), Q3 (RA3), Q4 (RA4), Q5 (RB1), Q6 (RB2), Q7 (RB3), Q8 (RB4), Q9 (RB5), Q10 (RB6), Q11 (RA5), Q12 (RA6)}
Monitoring registers: {M1(0), M2(0), M3(0), M4(0), M5(2), M6 (2), M7(0), M8(0), M9(0), M10(0), M11(2), M12(2)}

Figure 6:
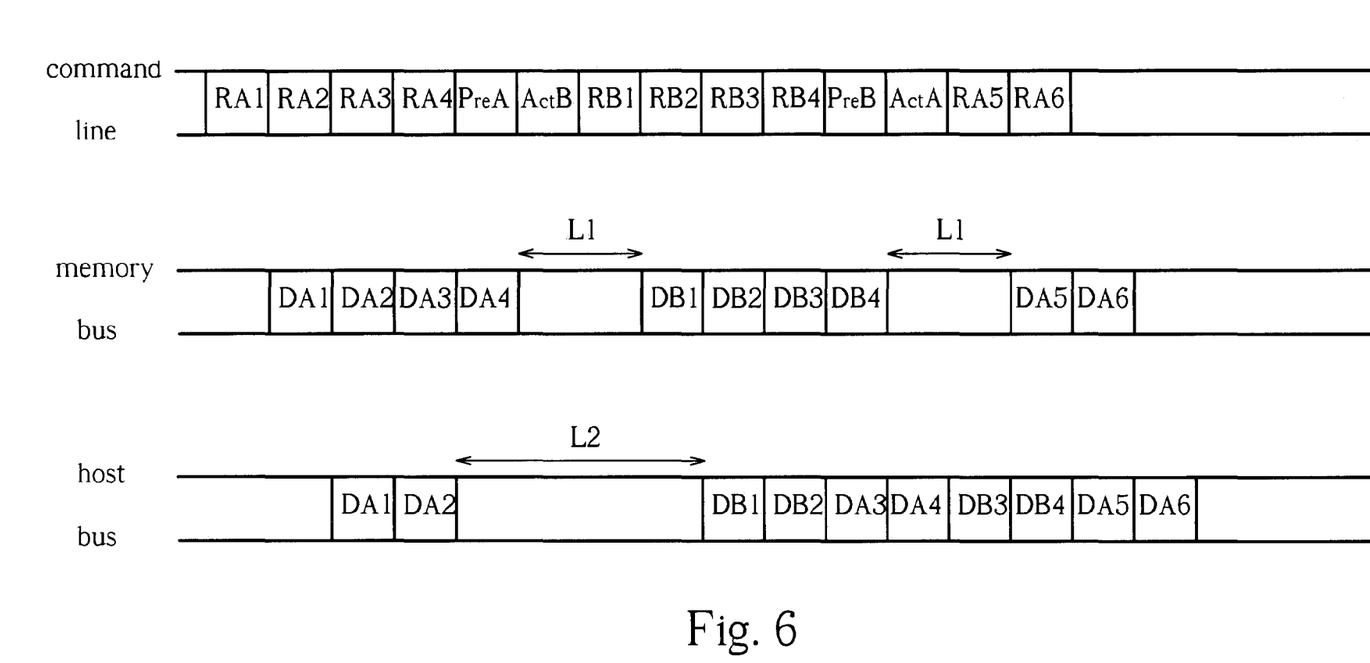
FIG. 6 is a diagram showing a data access operation of the memory device according to the reordering process of FIG. 5.

FIG. 6 is a diagram showing data access operation of the memory device 20 after the above described reordering process is done. As described above, the final request sequence becomes RA1, RA2, RA3, RA4, RB1, RB2, RB3, RB4, RB5, RB6, RA5, and RA6, and has been changed from the original request sequence: RA1, RA2, RB1, RB2, RA3, RA4, RB3, RB4, RA5, and RA6. As shown in FIG. 6, two page switch operations caused by two page misses introduce two latencies L1 for the memory bus, and only one latency L2 for the host bus. Compared with FIG. 2, FIG. 6 shows that the reordering of the read requests as described above saves significant time spent on switching pages. In addition, utilization of the host bus is more efficient. It is also shown that the data access operation requires a shorter period of time to complete delivering required data back to the master device.

In addition, the claimed memory controller 30 is located within a north bridge circuit. This north bridge circuit, therefore, is capable of reordering access requests and is denoted by a reorder-enabled north bridge circuit.

Comparing with FIG. 2, FIG. 6 also shows that latency L2 is greatly reduced. The overall performance of the data access operation is thus also greatly improved due to a better utilization of the host bus. A maximum allowance value is used in this disclosure to prevent the performance of the host bus from being worsened when reducing the time spent on switching pages. As clearly shown in FIG. 6, an ending of the memory bus activity is close to that of the host bus activity. A compromise of the memory bus utilization and the host bus utilization is achieved to optimize performance of data retrieval. It is noted that the maximum allowance value is programmable to meet requirements of different data processing systems for appropriately balancing performance of the memory bus and performance of the host bus. In other words, optimal performance of the memory bus and the host bus is obtained with the help of the appropriately programmed maximum allowance value.

The access requests accessing the same page are not only simply grouped, but also grouped to the extent practical so as not to violate the set maximum allowance value. That is, if an insertion of a newly received access request seriously delays previously queued access requests, the newly received access request is just pushed into the request queue as usual without invoking the reordering process. By closely monitoring the latency values of the previously queued access requests, the performance of the host bus will not be greatly deteriorated. As a consequence, the performance of the memory bus and the performance of the host bus are balanced to optimize the overall performance of the data processing system.

Those skilled in the art will readily observe that numerous modifications and alterations of the device and the method described may be made while retaining the teachings of the invention.

What is claimed is:

1. A method for accessing a memory device of a computer system, the memory device being electrically connected to a memory controller, the memory controller sequentially responding to a master device according to a sequence of access requests issued in order by the master device, the memory controller comprising a request queue, and a latency monitoring unit electrically connected to the request queue, the method comprising:
    (a) using the request queue to store access requests generated from the master device;
    (b) using the latency monitoring unit to record a plurality of latency values, the latency values respectively corresponding to the access requests stored in the request queue;
    (c) using the memory controller to receive a first access request and add the first access request to the request queue with an associated queue priority according to latency values associated with the access requests already stored in the request queue and respectively adding a predetermined increment value to the latency values corresponding to access requests in the request queue having associated queue priorities that are lower than the queue priority of the first access request; and
    (d) using the memory controller to sequentially access the memory device according to the associated queue priorities of the access requests stored in the request queue.

2. The method of claim 1 wherein step (c) further comprises:
    determining that the first access request is used to access a first page of the memory device; and
    determining if a second access request used to access the first page of the memory device and a third access request used to access a second page of the memory device have been stored in the request queue, the third access request immediately following the second access request and having a queue priority lower than a queue priority of the second access request.

3. The method of claim 2 wherein step (c) further comprises:

if a third latency value corresponding to the third access request is not greater than a maximum allowance value, assigning the first access request a queue priority that is higher than the queue priority of the third access request, assigning an initial value to a first latency value corresponding to the first access request, and increasing the third latency value by a predetermined increment value; and if the third latency value corresponding to the third access request is greater than the maximum allowance value, assigning the first access request a queue priority that is lower than the queue priority of the third access request, and assigning the initial value to the first latency value corresponding to the first access request.

4. The method of claim 3 wherein the maximum allowance value is programmable.

5. The method of claim 3 wherein if the third latency value corresponding to the third access request is not greater than a maximum allowance value, the queue priority assigned to the first access request is lower than the queue priority of the second access request.

6. The method of claim 2 wherein step (c) further comprises:
if the second access request stored in the request queue corresponds to a lowest queue priority, adding the first access request to the request queue with the lowest queue priority, and assigning an initial value to a first latency value corresponding to the first access request.

7. The method of claim 2 wherein step (c) further comprises:
if the request queue is empty, adding the first access request to the request queue, and assigning an initial value to a first latency value corresponding to the first access request.

8. The method of claim 1 wherein the memory device is a main memory of the computer system.

9. The method of claim 8 wherein the main memory is dynamic random access memory (DRAM).

10. The method of claim 1 wherein the memory controller is positioned within a north bridge circuit of the computer system.

11. A method of accessing a memory device of a computer system through a memory controller, the memory controller sequentially responding to a master device according to a sequence of access requests issued in order by the master device, the method comprising:
(a) storing access requests generated from the master device in a request queue;
(b) recording a plurality of latency values, the latency values respectively corresponding to the access requests stored in the request queue;
(c) receiving a first access request and adding the first access request to the request queue with an associated queue priority according to latency values associated with the access requests already stored in the request queue and respectively adding a predetermined increment value to the latency values corresponding to access requests in the request queue having associated queue priorities that are lower than the queue priority of the first access request; and
(d) sequentially accessing the memory device according to the associated queue priorities of the access requests stored in the request queue.

12. The method of claim 11 wherein step (c) further comprises:
determining that the first access request is used to access a first page of the memory device; and determining if a second access request used to access the first page of the memory device and a third access request used to access a second page of the memory device have been stored in the request queue, the third access request immediately following the second access request and having a queue priority lower than a queue priority of the second access request.

13. The method of claim 12 wherein step (c) further comprises:
if a third latency value corresponding to the third access request is not greater than a maximum allowance value, assigning the first access request a queue priority that is higher than the queue priority of the third access request, assigning an initial value to a first latency value corresponding to the first access request, and increasing the third latency value by a predetermined increment value; and if the third latency value corresponding to the third access request is greater than the maximum allowance value, assigning the first access request a queue priority that is lower than the queue priority of the third access request, and assigning the initial value to the first latency value corresponding to the first access request.

14. The method of claim 13 wherein the maximum allowance value is programmable.

15. The method of claim 13 wherein if the third latency value corresponding to the third access request is not greater than a maximum allowance value, the queue priority assigned to the first access request is lower than the queue priority of the second access request.

16. The method of claim 12 wherein step (c) further comprises:
if the second access request stored in the request queue corresponds to a lowest queue priority, adding the first access request to the request queue with the lowest queue priority, and assigning an initial value to a first latency value corresponding to the first access request.

17. The method of claim 12 wherein step (c) further comprises:
if the request queue is empty, adding the first access request to the request queue, and assigning an initial value to a first latency value corresponding to the first access request.

18. The method of claim 11 wherein the memory device is a main memory of the computer system.

19. The method of claim 18 wherein the main memory is dynamic random access memory (DRAM).

20. The method of claim 11 wherein the memory controller is positioned within a north bridge circuit of the computer system.

21. A memory controller for accessing a memory device of a computer system, the memory device being electrically connected to a memory controller, the memory controller sequentially responding to a master device according to a sequence of access requests issued in order by the master device, the memory controller comprising:
a request queue for storing access requests generated from the master device;
a latency monitoring unit electrically connected to the request queue for recording a plurality of latency values, the latency values respectively corresponding to the access requests stored in the request queue; and
a reorder decision-making unit electrically connected to the request queue for controlling a first access request added to the request queue with an associated queue priority according to latency values associated with the access requests already stored in the request queue and respectively adding a predetermined increment value to the latency values corresponding to access requests in the request queue having associated queue priorities that are lower than the queue priority of the first access request;

wherein the memory device is sequentially accessed according to the associated queue priorities of the access requests stored in the request queue.

22. The memory controller of claim 21 further comprises:
a page/bank comparing unit electrically connected to the reorder decision-making unit and the request queue for determining that the first access request is used to access a first page of the memory device and determining if a second access request used to access the first page of the memory device and a third access request used to access a second page of the memory device have been stored in the request queue, wherein the third access request immediately follows the second access request and has a queue priority lower than a queue priority of the second access request.

23. The memory controller of claim 22 further comprising:
a latency control unit electrically connected to the reorder decision-making unit and the latency monitoring unit for detecting whether a third latency value corresponding to the third access request is greater than a maximum allowance value.

24. The memory controller of claim 23 wherein the maximum allowance value is programmable.

25. The memory controller of claim 21 wherein the memory device is a main memory of the computer system.

26. The memory controller of claim 25 wherein the main memory is dynamic random access memory (DRAM).

27. The memory controller of claim 21 being positioned within a north bridge circuit of the computer system.

28. A method for accessing a memory device of a computer system, the method comprising:
receiving one or more access requests for accessing the memory device in a first predetermined order;
identifying that the first and the second access requests access the same memory page;
determining that a third access request is for accessing a different memory page;
identifying a latency value associated with the third access request;
examining whether the latency value associated with the third access request is increased to exceed a predetermined limit if the first access request is to be inserted;
inserting the first access request between the second and the third access requests in the request queue; and
increasing the latency value associated with the third access request by a predetermined incremental value.

29. The method of claim 28 wherein the third access request immediately follows the second access request in the request queue before the first access request is inserted.

30. The method of claim 28 wherein the predetermined incremental value is programmable.

31. The method of claim 28 wherein the maximum latency value is programmable.

32. A method for accessing a memory device of a computer system, the method comprising:
receiving one or more access requests for accessing the memory device, the access requests accessing one or more memory pages; and
identifying that a first access request received after a second access request accesses the same memory page as the second access request;
determining that a third access request is for accessing a different memory page:
identifying a latency value associated with the third access request;
examining whether the latency value associated with the third access request is increased to exceed a predetermined limit if the first access request is to be inserted;
inserting the first access request between the second and the third access requests in the request queue; and
increasing the latency value associated with the third access request by a predetermined incremental value; and
repeating the above identifying, determining and inserting steps for all received access requests.

33. The method of claim 32 wherein the predetermined incremental value is programmable.

34. The method of claim 32 wherein the maximum latency value is programmable.

* * * * *